Jan. 5, 1971    E. N. HANSEN    3,552,054
FISH TRAP
Filed Oct. 16, 1968    2 Sheets-Sheet 1
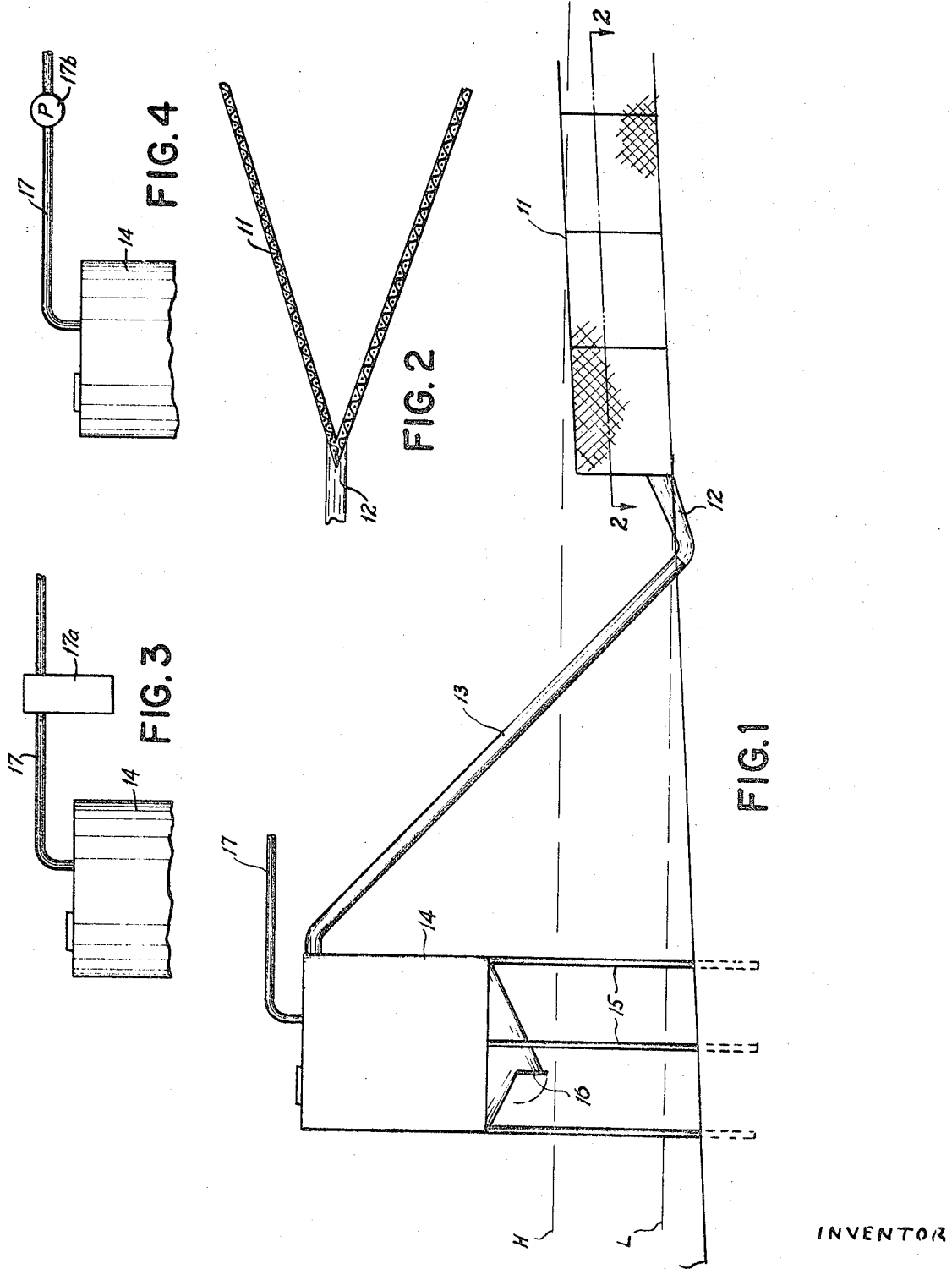
INVENTOR
EDWARD NORMAN HANSEN
By
ATTORNEYS 3,552,054
FISH TRAP
Edward Norman Hansen, 19 Egham Road, Victoria Park,
Western Australia, Australia
Filed Oct. 16, 1968, Ser. No. 768,136
Int. Cl. A01k 79/00
U.S. Cl. 43—6.5                                          3 Claims

ABSTRACT OF THE DISCLOSURE

A trapping net arranged to be at least partially submerged at high tide, a collecting tank adapted to be filled with water, the interior of the tank communicating with the space defined by the net by way of a conduit arranged to be filled with water, the conduit being of such dimensions as to allow the passage of fish from the net to the tank, the fish being caused to enter the conduit when the water level in the net drops with the tide.

---

This invention relates to a fish trap.

Conventional fish traps require considerable labour to transfer the caught fish from the trap, and the design of the trap often makes it impossible to use in some areas where the fish may be particularly abundant.

It is therefore an object of the present invention to provide a fish trap which does not suffer from the above disadvantages and which will allow the fish caught to be readily collected.

According to the present invention there is provided a fish trap comprising a trapping net arranged to be partially or wholly submerged at least at high tide, a collecting tank adapted to be filled with water, a connecting conduit one end of which is connected to the trapping net, the other end of which is connected to the collecting tank, the cross-section of the conduit being sufficiently large to allow fish to swim through the conduit from the trapping net to the collecting tank, said conduit being arranged to be filled with water, and means for maintaining the water level in said tank above the level of the said other end of the connecting conduit.

The invention may be better understood by reference to the following description of a preferred embodiment thereof as illustrated in the accompanying drawing which shows a side elevation of the fish trap located in a tidal estuary.

FIG. 1 is a side view of the present fish trap.

FIG. 2 is a cross-sectional view taken on line 2—2 of FIG. 1.

FIG. 3 is a side view of the top portion of a tank forming part of the present invention and including a vacuum tank.

FIG. 4 is a side view of the top portion of a tank forming part of the present invention and including a pump.

Figure 5:
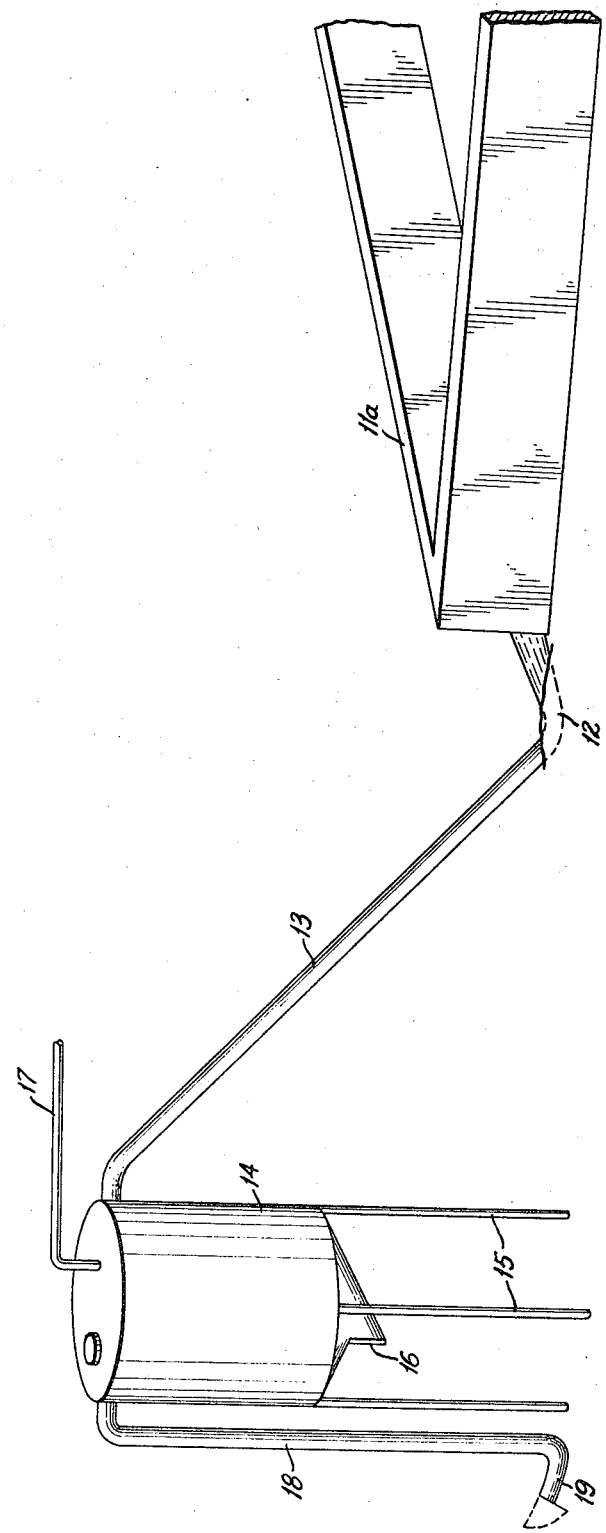
FIG. 5 is a perspective view of a modification of the present fish trap.

In the embodiment shown in FIGS. 1 and 2, the trapping net consists of a wedge shaped wire netting fence 11 positioned in a fixed location on the shores of the tidal estuary with the apex of the fence 11 facing or pointing out to sea, the fence 11 being so located that at high tide, at least, the fence will be partially or wholly submerged below the high water line H, while at low tide, the upper portion of the fence, at least, is above the low water line L. The wire netting forming the fence 11 has openings which allow the smaller fish to escape. The lowest portion of the apex of the fence 11 is preferably provided with a funnel member 12 preferably formed of a transparent or translucent material, the funnel member 12 being connected to one end of the connecting conduit or tube 13. The mouth of the funnel member 12 is preferably provided with a grid or grille to prevent large fish from entering into the funnel member 12. The connecting tube 13 passes upwardly from the funnel member 12 to a point at or adjacent the upper end of a collecting tank 14 which is preferably mounted out to sea on a suitable supporting framework 15 lodged firmly in the sea bed S. The tube 13 is preferably circular in cross-section and is of sufficient diameter to allow fish to swim therethrough with out turning around. The tank 14 may be substantially cylindrical in shape, the lower portion of the cylindrical walls of the tank converging inwardly and downwardly to terminate at a discharge outlet 16. The supporting framework is so arranged at a suitable height so that a fishing vessel or other boat can be steered to a position to allow any fish collected in the tank 14 to be discharged from the outlet 16 into the vessel. The connecting conduit 13 may, if desired, be provided with a hinged flap at its upper end which prevents fish in the tank 14 returning down the tube 13 to the trapping net. The collecting tank 14 is filled with sea water and in this embodiment, in order to maintain the tank 14 and that part of the conduit 13 above sea level, full of water a suction line 17 is attached to the upper end of the tank 14, the suction line 17 leading to a vacuum tank 17a, FIG. 3, or suction pump 17b, FIG. 4. To prevent water in the tank 14 being drawn into the line 17 a ball valve is located at the mouth of the suction line 17; the ball floating on the water in the tank and adapted to close the mouth of the line 17 when the water reaches the desired level in the tank. If desired the tank 14 may be provided with valves (not shown) leading from the tank, which valves may be operated to allow air to enter into, and water to escape from, the tank before the fish collected therein are discharged.

In use the trapping net is located on the shore of a tidal estuary in a region where it is known an abundance of fish exists. As described above the net 11 is located so as to be partially or wholly submerged at high tide and the fish enter into the net and are caught therein as the tide recedes. It is known that when fish are frightened they tend to dive for deep water, consequently the fish automatically head for the area adjacent the funnel shaped member 12 and as a result swim into that member and up the conduit 13 into the collecting tank 14 where they are retained preferably until the tide has reached its lowest level and has risen again sufficiently to allow a boat to sail beneath the discharge outlet 16 and the contents of the tank 14 are then discharged into the boat.

As shown in FIG. 5 a modified form of the above described embodiment has an outlet or syphon tube 18 which leads from the collecting tank 14 to a point below the low water level L. In this modified form the trapping net is in the form of a dam 11a which, when the sea level has dropped below the upper end of the walls of the dam, only allows water to escape from the dam, through the connecting conduit 13. The outlet tube 18 preferably drains from the lower part of the tank 14, thus the connecting conduit 13, the collecting tank 14 and the outlet tube 18 act as a syphon to draw water from the trapping net out to the sea. This thus tends to induce a relatively strong current in the conduit 13 which helps induce the fish in the net 11 or dam 11a to move into the funnel member 12 and up the conduit 13 into the tank 14. The end of the outlet tube 18 within the tank is also preferably fitted with a grid which allows only small fish to pass therethrough. The end of the outlet tube 18 within the sea may be provided with a delayed action valve 19 which will operate at some time after the sea level has dropped to a level below that of the water in the dam. This ensures an increase in the velocity of water flowing through the conduit 13. If desired a pump may be installed to boost the flow of water from the dam through the conduit 13.

It will be appreciated that the invention is not intended to be limited to the embodiment and modifications thereof as described, as other alternatives are envisaged as being within the scope of the invention. For example, instead of having the collecting tank located out to sea, the tank may be located on the shore of the estuary. Alternatively the trapping net may be located out to sea and may, for example, be in the form of a set net or in the form of a trawl. Also if the connecting conduit 13 extends for any distance under the water, it may be provided with apertures which allow small fish to escape and which also allow sea water to circulate from the surrounding sea into the conduit 13. A portion of the connecting conduit 13 may also be made transparent or translucent if desired.

In an alternative form of the invention, the collecting tank may be in the form of a well boat or barge floating on the ocean, the water in the holds of the barge being open to atmosphere and the connecting conduits entering into the hold from below the water line of the vessel.

Other methods of inducing or attracting the fish into the conduit may be incorporated if desired, which methods may be electrical, mechanical, visual, auditory or olfactory.

I claim:

1. A fish trap comprising a trapping net arranged to be at least partially submerged at least at high tide, a collecting tank capable of being filled with water, a connecting conduit to be filled with water, having one end connected to said trapping net and its other end connected to said collecting tank with the cross-section of said conduit being of a size to allow fish to swim through said conduit from said trapping net to said collecting tank, means for maintaining the water level in said tank above the level of said other end of said connecting conduit, said trapping net being in the form of a dam to be located on the shore of a tidal estuary with the walls of the dam being submerged at high tide while the upper portion of the walls are above the low water level at low tide, and an outlet tube connected to said collecting tank with the discharge end of the outlet tube being located below said collecting tank whereby the water in said dam would be caused to syphon through the connecting conduit into said collecting tank and through said outlet tube at said low water level.

2. A fish trap comprising a trapping net arranged to be at least partially submerged at least at high tide, a collecting tank capable of being filled with water, a connecting conduit to be filled with water, having one end connected to said trapping net and its other end connected to said collecting tank with the cross-section of said conduit being of a size to allow fish to swim through said conduit from said trapping net to said collecting tank, means for maintaining the water level in said collecting tank above the level of said other end of said connecting conduit consisting of a suction line connected to the upper end of said collecting tank and a suction pump connected to said suction line.

3. A fish trap comprising a trapping net arranged to be at least partially submerged at least at high tide, a collecting tank capable of being filled with water, a connecting conduit to be filled with water, having one end connected to said trapping net and its other end connected to said collecting tank with the cross-section of said conduit being of a size to allow fish to swim through said conduit from said trapping net to said collecting tank, means for maintaining the water level in said tank above the level of said other end of said connecting conduit consisting of a suction line connected to the upper end of said collecting tank and a vacuum tank connected to said suction line.

References Cited

UNITED STATES PATENTS 2,663,117  12/1953  Ederer _____ 43—100

FOREIGN PATENTS 136,058  6/1952  Sweden _____ 43—14

WARNER H. CAMP, Primary Examiner